United States Patent

[11] 3,583,183

| [72] | Inventors | Herbert A. McAninch<br>Auburn, Ind.;<br>Herbert N. Underwood, Chicago, Ill. |
|---|---|---|
| [21] | Appl. No. | 778,566 |
| [22] | Filed | Nov. 25, 1968 |
| [45] | Patented | June 8, 1971 |
| [73] | Assignee | Borg-Warner Corporation<br>Chicago, Ill. |

[54] HYDRAULIC TRANSMISSION INCLUDING TEMPERATURE CONTROLLED ORIFICE
18 Claims, 3 Drawing Figs.

[52] U.S. Cl. .............................................. 68/23.7,
60/52, 417/236, 417/292
[51] Int. Cl. .................................................. D06f 29/00,
F15b 15/18
[50] Field of Search ............................................ 417/32,
236, 292; 60/52 VM, 53; 68/23, 23.7

[56] References Cited
UNITED STATES PATENTS

| 1,871,287 | 8/1932 | Whittaker | 138/46 |
|---|---|---|---|
| 2,451,707 | 10/1948 | Armstrong | 236/93 |
| 2,513,720 | 7/1950 | Hallinan | 239/75 |
| 2,815,718 | 12/1957 | Avery | 103/161 |
| 2,820,473 | 1/1958 | Reiners | 137/468 |
| 2,830,621 | 4/1958 | Prescott | 138/46 |
| 2,902,222 | 9/1959 | Noakes | 236/93 |
| 2,966,170 | 12/1960 | Raulins | 137/468 |
| 3,340,893 | 9/1967 | Lockwood | 137/468 |

*Primary Examiner*—Edgar W. Geoghegan
*Attorneys*—Donald W. Banner, Lyle S. Motley, C. G. Stallings and William S. McCurry

ABSTRACT: A hydraulic transmission for use in a fabric-treating machine incorporating a temperature sensitive valve in communication with the outlet of a hydraulic pump, the valve defining a variable size flow passage which decreases in size as the temperature of the hydraulic fluid increases thereby compensating for the increase of pump leakage with rising fluid temperatures and resulting in maintaining a constant speed of the output member driven by the hydraulic pump despite varying fluid temperatures.

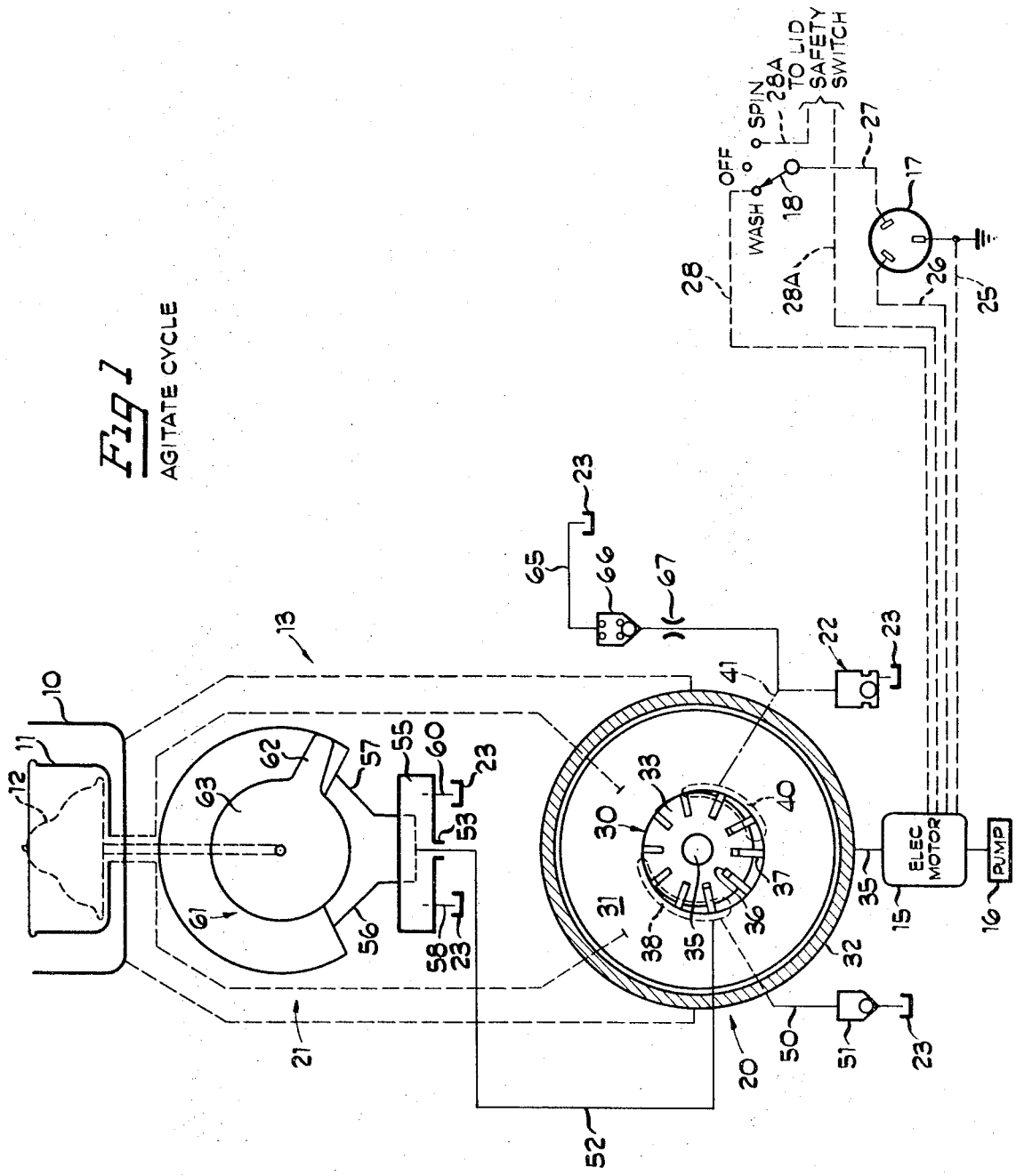

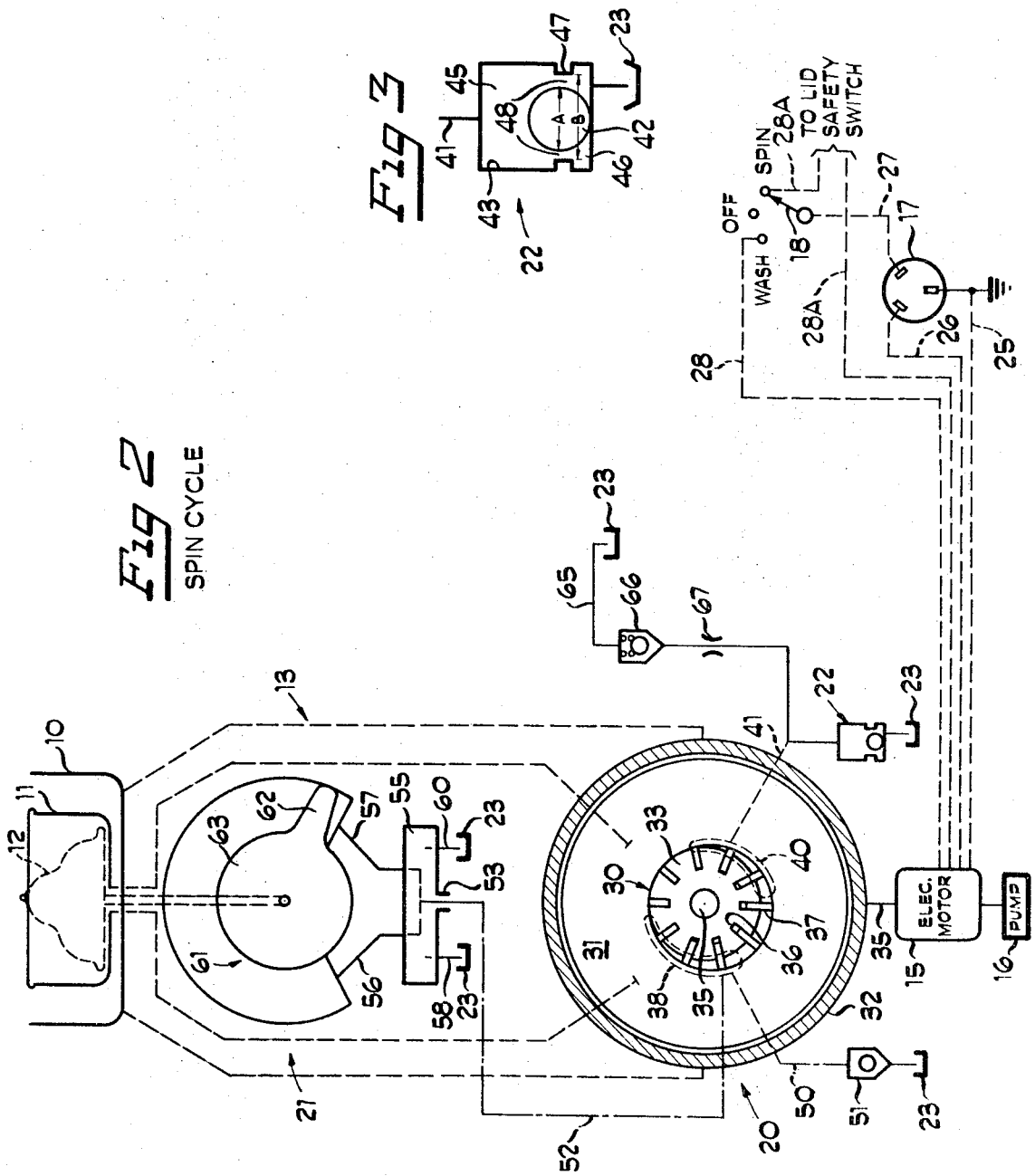

3,583,183

HYDRAULIC TRANSMISSION INCLUDING TEMPERATURE CONTROLLED ORIFICE

SUMMARY OF THE INVENTION

This invention relates to hydraulic transmissions and more particularly to a hydraulic transmission adapted for use in a fabric-treating machine employing an oscillatable agitator and a rotatable clothes container.

Various approaches have been utilized to provide such a hydraulic transmission having a minimum number of operating parts. One approach has been developed utilizing a hydraulic pump and one oscillatory hydraulic motor connected to an agitator and is shown in U.S. Pat. No. 3,388,569 issued to C. E. Kurtz. The hydraulic pump operating in one direction of rotation supplies fluid pressure to actuate the oscillatory motor during the "AGITATE" cycle of the clothes washer. Operating in the other direction of rotation the hydraulic pump is utilized as a hydraulic coupling drivingly connectable to and rotating the clothes container during the extract or "SPIN" cycle of the clothes washer, thus eliminating, in its entirety, a separate hydraulic motor for the "SPIN" cycle, previously believed to be essential to provide an operative transmission for clothes washers.

One problem which exists in this type of hydraulic transmission is a variation in spin speed of the clothes container corresponding to a variation in the temperature of the hydraulic fluid used in the system. It is desirable that during both the "AGITATE" and "SPIN" cycles, the operational speed remains constant for a large temperature range and under various clothes-load conditions. However, during the "SPIN" cycle what happens in fact is that as the fluid temperature increases, the viscosity decreases and the leakage from the hydraulic pump increases resulting in a decrease in the speed of rotation of the clothes container in the order of magnitude of several hundred r.p.m. over a temperature range of about 115°.

The present invention is an improvement over the transmission shown and described in U.S. Pat. No. 3,388,569 in that a temperature sensitive valve is incorporated in communication with the outlet of the hydraulic pump which valve is effective to allow a restricted flow of fluid from the pump to a sump during "SPIN" cycle. As the fluid temperature increases, and, correspondingly, the pump leakage increases, the flow passage defined by the valve decreases in size reducing the flow to sump through the valve by an amount equal to the increase in pump leakage over the same temperature range. The net effect is a constant total leakage for the hydraulic circuit resulting in a constant spin speed over a wide temperature range at a very slight cost increase.

BRIEF DESCRIPTION OF THE DRAWINGS

FIG. 1 is a schematic view of a hydraulic transmission for a clothes washer during the "AGITATE" cycle and embodying the principles of the invention;

FIG. 2 is a schematic view showing the hydraulic transmission during the "SPIN" cycle operation;

FIG. 3 is a detailed view of the temperature sensitive valve.

DESCRIPTION OF THE PREFERRED EMBODIMENT

Referring to FIG. 1, a fabric-treating machine in the form of an automatic clothes washing machine is illustrated comprising a tub 10 adapted to hold a laundering fluid; a clothes container 11 and an oscillatory agitator 12. A hydraulic transmission 13 is illustrated for independently driving either the clothes container 11 for effecting a centrifugal drying operation herein referred to as the "SPIN" operation or the oscillatory agitator 12 for effecting and "AGITATE" or "WASH" cycle. An electric motor 15 is provided having a water pump 16 driven thereby for recirculating water to the clothes container 11 of the automatic washer and a source of power 17 is illustrated for operating the motor 15. A cycle selector switch 18 is schematically illustrated in simplified form although in a washer installation, this function would be performed by a timer switch mechanism of known construction.

The important elements of the hydraulic transmission are as follows: a constant volume reversible hydraulic pump 20; an oscillatory agitator motor 21; and a fluid control system including a temperature sensitive valve 22.

A fluid sump 23 is provided which is schematically illustrated for convenience at various places in the illustration of the invention, although in the actual construction, one fluid sump is provided into which all the exhaust connections for various elements of the transmission exhaust fluid pressure. Electric leads 25 and 26 interconnect the source of power 17 with the motor 15, the lead 25 being a ground line. Lead 27 connects the source of power 17 to switch mechanism 18. Switch mechanism 18 is connected to the motor by a lead 28 for wash action, and by a lead 28A through a lid safety switch not shown for spin action.

The hydraulic pump 20 includes a pumping element 30 and a rotatable pump housing element 31 positioned within a fixed case 32.

Any number of well-known types of hydraulic pumps would adequately perform the functions of the hydraulic pump 20 as for example, the crescent type or the gerotor type; but for reasons that will be later described, it is found that the vane-type pump will perform best in the present transmission. For this reason, the hydraulic pump 20 is illustrated as a vane pump.

The pumping element 30 consists of a rotor 33 connectable to a rotatable drive member 35 of the electric motor 15. The rotor 33 contains a series of radial slots 36. A plurality of vanes 37 are provided each vane being adapted to slide within a slot 36.

The pump housing element 31 is rotatable within the case 32 which is fixed to the stationary tub 10. The pump housing element 31 consists of an annular disc mounted eccentric to the rotor 33 and is shown drivingly connected to the clothes container 11. A pair of arcuate ports 38 and 40 are formed in the pump housing element 31 for communicating fluid from the sump 23 to pump 20 and, after the fluid is pressurized, from the pump 20. The ports 38 and 40 will either be inlet ports or exhaust ports depending upon the direction of rotation of the electric motor 15 and thereby the direction of rotation of the rotor 33.

The fluid conduit 41 is provided to communicate fluid from the sump 23 to port 40 when the motor 15 is operated in a direction so as to activate the agitate circuit. The temperature sensitive valve 22 is disposed between the conduit 41 and sump 23 and is operative to provide free flow from sump 23 to conduit 41 when the motor 15 is operated in a direction to activate the agitate circuit but allows only a restricted flow from conduit 41 to sump 23 when the motor is operated in a direction to activate the spin circuit.

The temperature sensitive valve 22 is best shown in FIG. 3 and includes a ball 42 of a plastic material expandible and contractable by variations in temperature of the contacting fluid. The ball is disposed within a cylinder 43. The cylinder 43 includes an upper chamber 45 and a lower chamber 46 separated by an annular ring 47. The ball 42 is sized such that it has a diameter "A" less than the internal diameter "B" of the annular ring 47 at normal start up temperature. At the maximum fluid temperature expected to be obtained, the diameter "A" of ball 42 is substantially the same as the internal diameter "B" of the ring 47 forming a seal between upper chamber 45 and lower chamber 46. At temperatures lower than the maximum expected operating temperature the ball 42 and annular ring 47 cooperate to define a flow passage 48 of annular configuration connecting upper chamber 45 and lower chamber 46.

Fluid conduit 50 is provided to communicate fluid from sump 23 to port 38 when the electric motor is operated in a direction to activate the spin cycle. Check valve 51 allows fluid flow only in a direction from the sump 23 into pump 20.

During the "AGITATE" cycle a fluid circuit is established as shown in FIG. 1. A first fluid conduit 52 connects the pump 20 to an inlet 53 of a reversing valve 55 provided to alternately direct fluid pressure to either side of the agitator motor 21 through fluid conduits 56 or 57. Fluid is exhausted from the agitator motor 21 to sump 23 through conduits 58 and 60.

The agitator motor 21 is of the rotary actuator or single vane motor type and receives fluid from the reversing valve 55. The agitator motor 21 includes a rotary actuator 61 connected to the agitator 12. The rotary actuator 61 comprises a vane 62 attached to an integral hub section 63. Any combination of commonly used vane fluid motors and reversing valves may be used, for example the type whose operation is described in U.S. Pat. No. 3,383,856.

During the "SPIN" cycle a circuit is established as shown in FIG. 2. A fluid conduit 65 connects a relief valve 66 and the fluid sump 23. The relief valve 66 is provided in communication with the conduit 41 and is adapted to allow flow only from conduit 41 to sump. In the absence of pressure in the spin circuit, the relief valve 66 will be biased closed. A restriction 67 is provided in conduit 41 between the pump 20 and relief valve 66.

The operation of the hydraulic transmission of the present invention in summary is as follows: The timer or cycle selector switch of the automatic washer as schematically represented by switch 18 will select either the "AGITATE" or "SPIN" cycle for the hydraulic transmission.

When the electric motor 15 is activated in either direction of rotation, the pumping element 30 will also rotate, its speed of rotation corresponding to the speed of rotation of the rotatable drive member 35. After the first revolution of the pumping element 30, the vanes 37 will be disposed within their corresponding slots 36 out of contact with the pump housing element 31 effecting a zero output of the pump 20 since no pumping action is taking place.

At a predetermined rotational speed, the vanes will be urged to move radially outward by centrifugal force to contact the pump housing element 31 thereby initiating the pumping action. The desired rotational speed at which pumping becomes effective can be achieved by properly designing the geometry of the rotor and vanes. The obvious result of using this particular type of hydraulic pump is that it enables the electric motor to build up sufficient speed before imposing a load on it. This allows use of a more economical split-phase motor rather than a more expensive capacitive start motor.

If the "AGITATE" cycle is selected, the pump 20 supplies fluid pressure to conduit 52 which communicates the fluid to reversing valve 55 and agitate motor 21 to drive the agitator of the washing machine. The speed of the agitate motor 21 is directly proportional to the volume of fluid supplied to the motor 21 per unit time. Using a constant displacement pump the volume flow per unit time remains essentially constant resulting in a constant agitator speed.

If the "SPIN" cycle is selected, as shown in FIG. 2, the pump 20 supplies fluid pressure to conduit 41 which acts to bias ball 42 of temperature sensitive valve 22 to its restricted or bleed position. The fluid pressure communicated from conduit 41 acts to bias relief valve 66 into its open position and allow communication from pump 20 to sump 23 through the flow restriction 67. The fluid flow through restriction 67 and relief valve 66 provides a pressure build up which causes the housing to react and provide torque to rotate the pump housing and connected basket 11 in the same direction as the motor 15 is rotating. As the basket is hydraulically coupled to the electric drive motor 15 through the hydraulic coupling provided by the pump, the basket rotates at a speed effective to provide spin extract drying of the clothes.

As the temperature of the hydraulic fluid in the system increases, the viscosity of the fluid decreases and leakage from the pump increases. Absent a temperature sensitive valve, such as that illustrated at 22, the result of increased leakage would be an increase in the relative slippage between pump element 30 and housing element 31 effecting a reduction in the speed of the clothes container 11. The temperature sensitive valve 22 is so designed, however, that as the fluid temperature increases the diameter of the ball 42 increases thereby reducing the annular area of the flow passage 48 defined between ball 42 and annular ring 47.

Two factors must be considered in arriving at a properly dimensioned temperature sensitive valve. First, the material from which the ball is made must have a thermal coefficient of expansion sufficiently greater than the thermal coefficient of expansion of the material defining the annular ring 47 so that for temperature variations within the desired range the difference in expansion between the ball and ring will significantly vary the annular area. Examples of material combinations which have been found to perform adequately are balls made of a plastic material such as Polypropylene or Nylon 12 used in conjunction with a metallic ring such as steel or aluminum. Polypropylene balls have been found to be superior when the hydraulic fluid used is water or Type A Suffix A Automatic Transmission Fluid. Balls made of Nylon 12 give better results if the fluid used is Kendall Super Black.

Secondly, the dimensions of the ball and the ring must be designed to effect a reduction in annular area and correspondingly a reduction in fluid flow to sump over a given temperature range which is equal to the increase in flow over the same temperature range due to increased pump leakage over that range. The net result which is obtained as leakage through the annular flow passage decreases at the same rate pump leakage increases, is a maintaining of a constant leakage flow for the entire system over the temperature range desired. This provides a constant spin speed of the clothes container over the entire temperature range.

Thus it has been shown that the speed of the clothes container 11 can be maintained constant with a constant input speed over a given temperature range by providing a temperature sensitive valve connected to the outlet of the hydraulic pump. A spin speed of about 600 r.p.m. has been found to be adequate for most applications, and by the use of a temperature sensitive valve such as illustrated herein the speed can be held to a variation of not more than 25 r.p.m.

We claim:

1. A drive arrangement for a fabric-treating machine including a fabric container; the drive arrangement comprising a hydraulic pump comprising a pumping element and a pump housing element which are relatively rotatable; means connected to one of said elements to rotate said element, the other of said elements adapted to be connected to said fabric container; inlet means associated with said pump; outlet means associated with said pump; means for restricting the flow of fluid from said pump to initiate rotation and thereafter accelerate rotation of said fabric container; valve means in fluid communication with said outlet means, said valve means being temperature sensitive and operative to define a flow passage between said outlet means and a fluid sump, said flow passage decreasing in size as the temperature of said hydraulic fluid increases.

2. A drive arrangement as in claim 1 in which said valve means includes a cylinder member having an inner diameter and a ball member disposed within said cylinder having an outer diameter, said ball and said cylinder cooperative to define said flow passage between said outer diameter of said ball and said inner diameter of said cylinder.

3. A drive arrangement as in claim 2 in which said ball member and said cylinder member are comprised of materials having a different thermal coefficient of expansion such that said ball has a greater thermal coefficient of expansion than said cylinder.

4. A drive arrangement as in claim 3 in which said ball member is a plastic material and said cylinder member is metallic.

5. A drive arrangement as in claim 2 in which said ball is polypropylene and said cylinder is steel.

6. A drive arrangement as in claim 2 in which said ball is nylon and said cylinder is steel.

7. A drive arrangement as in claim 2 in which said ball is polypropylene and said cylinder is aluminum.

8. A drive arrangement as in claim 2 in which said ball is nylon and said cylinder is aluminum.

9. A drive arrangement as in claim 2 in which said cylinder includes an upper chamber and a lower chamber of substantially the same diameter, said chambers being separated by an annular ring of smaller diameter whereby said ball and said annular ring cooperate to define said flow passage which decreases in size as the temperature of hydraulic fluid increases.

10. A hydraulic transmission including a motor having a rotatable drive member; a positive displacement hydraulic pump comprising a pumping element and a pump housing element which are relatively rotatable, one of said elements connected to said drive member; and output member connected to the other of said pumping elements; fluid inlet means associated with said pump; fluid outlet means associated with said pump; temperature sensitive valve means disposed between the outlet of said pump and a fluid sump, said valve means defining a flow passage which decreases in size as the temperature of the hydraulic fluid passing therethrough increases; and means for restricting the flow of fluid through said pump to initiate rotation and thereafter accelerate rotation of said output member.

11. The hydraulic transmission as in claim 10 in which said valve means includes a cylinder having an inner diameter and a ball disposed within said cylinder having an outer diameter, said ball and said cylinder cooperative to define said flow passage between said outer diameter of said ball and said inner diameter of said cylinder.

12. A hydraulic transmission as in claim 11 in which said ball and said cylinder are comprised of materials having a different thermal coefficient of expansion such that said ball has a greater thermal coefficient of expansion than said cylinder.

13. A hydraulic transmission as in claim 12 in which said ball is a plastic material and said cylinder member is metallic.

14. A hydraulic transmission as in claim 11 in which said ball is polypropylene and said cylinder is steel.

15. A hydraulic transmission as in claim 11 in which said ball is nylon and said cylinder is steel.

16. A hydraulic transmission as in claim 11 in which said ball is polypropylene and said cylinder is aluminum.

17. A hydraulic transmission as in claim 11 in which said ball is nylon and said cylinder is aluminum.

18. A hydraulic transmission as in claim 11 in which said cylinder includes an upper chamber and a lower chamber of substantially the same diameter, said chambers being separated by an annular ring of smaller diameter whereby said ball and said annular ring cooperate to define said flow passage which decreases in size as the temperature of hydraulic fluid passing therethrough increases.